United States Patent Office 3,017,371
Patented Jan. 16, 1962

3,017,371
EXPANDABLE COMPOSITION CONSISTING ESSENTIALLY OF POLYOLEFIN, METAL SOAP AND p,p'-OXYBIS (BENZENE SULFONYL HYDRAZIDE), PROCESS FOR PREPARING SAME AND WIRE COATED WITH SAME
Paul M. Hohenberg, Cambridge, William R. James, Wilbraham, and Heinz E. Wechsberg, Springfield, Mass., assignors to Monsanto Chemical Company, St. Louis, Mo., a corporation of Delaware
No Drawing. Filed Oct. 9, 1958, Ser. No. 766,364
15 Claims. (Cl. 260—2.5)

This invention relates to the production of aliphatic polyolefin rigid foams and more particularly to compositions which can be extruded and when cooled produce such foams.

The expedient of foaming polyolefins is presently appreciated. The foamed products and particularly foamed polyolefins have utility as electrical insulators in that polyethylene itself has a relatively low dielectric constant which is further diminished by air or other inert gases becoming retained in the cellular structure of the foamed polyethylene. To take full advantage of this expedient, the cells should have fine or small diameters relative to their number in a given cross section. They should be discrete or unicellular (not interconnected) and should be uniformly distributed throughout the polyethylene matrix in order to insure uniformity of insulating and mechanical properties. Included within the latter is uniform strength and smooth surface. Additionally, the expandable compositions used in producing these foams should be such as to allow for their production by extruding into a simple cooling medium such as air or water, rather than requiring the use of molds with which to regulate the expansion of the foams and prevent their collapse. By eliminating the need for molds, considerable capital expenditure can be eliminated.

For the most part, the expandable polyolefin compositions which are available have been incapable of providing foamed products exhibiting the desirable qualities outlined above without relying on molds or other restrictive and shaping expedients.

Accordingly, it is the principal object of the present invention to provide rigid aliphatic polyolefin foams having uniform, discrete and fine-celled structures.

Another object is to provide expandable aliphatic polyolefin compositions which can be extruded to provide these foams.

Another object is to provide expandable aliphatic polyolefin compositions which can be extruded into simple cooling media, to provide foams having the desired cellular structures.

Another object is to allow production of fine-celled foams using simple mixing procedures.

Other objects of the invention will in part be obvious and will in part appear hereinafter.

These and other objects of the invention can be attained through the use of an expandable thermoplastic polymeric composition comprising in admixture (a) a polymeric material selected from the class consisting of aliphatic polyolefins, the monomeric units of which contain 2–4 carbon atoms (b) p,p'-oxybis(benzene sulfonyl hydrazide) and (c) a metal soap selected from the class consisting of metal salts of fatty acids, the metals being divalent and trivalent in nature and the fatty acid moiety containing at least 8 carbon atoms, and mixtures of the same.

The following examples are given in illustration of the invention. Where parts are mentioned, unless otherwise described, parts by weight are intended.

Example I

An expandable composition is prepared by blending together the following ingredients:

| | Parts |
|---|---|
| Particulate polyethylene (.125 inch diameter) | 100 |
| p,p'-Oxybis(benzene sulfonyl hydrazine) (15 micron mean particle size) | 1 |
| Zinc stearate (200 mesh U.S. Sieve) | 1 |
| p,p'-Phenylenediamine | 0.05 |

The ingredients are mixed together in a drum tumbler for 20 minutes at 45 r.p.m. The resultant admixture is then extruded at a stock temperature of about 180° C. through a 1.5" diameter extruded, using a constant-pitch, decreasing-depth screw. The extrusion is made into a cooling medium comprising water being maintained at room temperature. The foamed product which results exhibits a density of 0.45 gram/cm.$^3$ and a fine, even unicellular structure together with a smooth surface.

Example II

Four thousand grams of polyethylene having a density of .910–0.920 gram/cm.$^3$ are masticated on a 12 x 24", 2-roll mill, the rolls being of steel construction and maintained at a temperature of 100° C. When the polyethylene becomes coalesced into sheet form, 40 grams of p,p'-oxybis (benzene sulfonyl hydrazide), 40 grams of calcium stearate (200 mesh U.S. Sieve) and 4 grams of 4,4'-thiobis(6-tert-butyl-m-cresol) are added and milling is continued at a temperature of 105°C.–125° C. until essentially complete blending of the constituents is attained. The sheet is then removed from the mill and cut into granules of .125" diameter. The expandable granular material is then extruded in the manner prescribed in Example I to give a fine-celled, smooth-surface foam exhibiting uniform and discrete cellular structure throughout. The density of the extruded foam is 0.47 gram/cm.$^3$.

Example III

The procedure of Example II is repeated with the exception that the metal soap is not included. The resulting foam attained from extruding the material into a cooling medium constituting water being maintained at room temperature, exhibits a rough surface together with large cells, the latter unevenly distributed and partially interconnected. The density of the extruded foam is 0.48 gram/cm.$^3$.

Example IV

Expandable polyethylene composition prepared in accordance with Example II is extruded over 20 mil solid copper wire, using a 90° cross-head fitted on a 1.5" diameter extruder. At a stock temperature of 190°– C.–195° C., a rigid coating is obtained on the wire constituting finely cellular polyethylene foam, the cells of which are uniformly distributed throughout the polyethylene. A cross-sectional area of this coating when viewed under a microscope has a cell count of about 6000/cm.$^2$.

By contrast the expandable polyethylene of Example III which does not contain the metal soap, when extruded under the same conditions, results in a foamed coating which is coarsely cellular and exhibits a rough surface. A cross-sectional area of this coating when viewed under a microscope has a cell count of about 300/cm.$^2$.

Examples V–XI

Expandable polyethylene compositions are prepared using the blending procedure set forth in Example I. Variations are carried out by substituting the following metal soaps for the zinc stearate used in that example.

V Barium stearate
VI Magnesium stearate

VII Aluminum monostearate
VIII Aluminum distearate
IX Aluminum hydroxy stearate
X Aluminum palmitate
XI Aluminum octoate When the expandable polyolefin compositions are extruded in the manner set forth in Example I, each results in a rigid foam, the cellular structure of which is constituted of cells which are of fine size, evenly distributed throughout the polyethylene matrices and unicellular in nature.

The expandable thermoplastic polymeric compositions of the present invention comprise an admixture of (a) a polymeric material selected from the class consisting of aliphatic polyolefins, the monomeric units of which contain 2–4 carbon atoms, (b) p,p'-oxybis(benzene sulfonyl hydrazide) and (c) a metal soap selected from the class consisting of metal salts of fatty acids, the metals being divalent and trivalent in nature and the fatty acid moieties containing at least 8 carbon atoms and mixtures of the same.

The aliphatic polyolefins include those containing 2–4 carbon atoms in their monomeric units such as polyethylene and polypropylene. They are extrudable by nature indicating a molecular weight of greater than about 12,000 and densities falling between .910–.970 gram/cm.$^3$. Materials of this nature are commonly referred to as resins. The aliphatic polyolefin most desirable is a homopolymer of ethylene.

The metal soaps which can be utilized consist of metal salts of fatty acids, the metals being divalent and trivalent in nature and the fatty acid moieties containing at least 8 carbon atoms and mixtures of the same. Soaps of the metals zinc, calcium, barium, aluminum and magnesium are preferred. The fatty acids from which the metal soaps are derived include octoic acid, capric acid, oleic acid, palmitic acid, stearic acid and the like with preference directed to those containing 12–20 carbon atoms. In addition to the metal salts of the fatty acids themselves, substituted fatty acids can also be used. Representative of the metal soaps then are zinc stearate, calcium stearate, barium stearate, magnesium stearate, aluminum monostearate, aluminum distearate, aluminum hydroxy stearate, aluminum palmitate and aluminum octoate. The amount of metal soap prescribed preferably lies between 0.1–5.0 weight percent on the weight of the aliphatic polyolefin and more preferably 0.5–1.5 weight percent. With regard to the p,p'-oxybis(benzene sulfonyl hydrazide) good results are had from the use of 0.5 to 1.5 weight percent on the weight of the aliphatic polyolefin. More specifically about 1.0 weight percent of this blowing agent is recommended.

In addition, antioxidants such as p,p'-phenylene diamine, 4,4'-thiobis-(6-tert-butyl-m-cresol) can be used in the formulation of the expandable composition. Other materials which can be added include pigments such as carbon black and earth pigments, also butyl rubber, inorganic fillers and the like.

The expandable aliphatic polyolefin compositions can be obtained through various processes which contribute an intimate admixture of the prescribed components. Mill-rolls, Banbury and other hot-mixing apparatuses can be used. When any of the foregoing are used, the temperature at which admixture is carried out is less than the temperature at which decomposition of the p,p'-oxybis(benzene sulfonyl hydrazide) takes place which is about 130° C. It is particularly significant that the foamable composition can also be produced by the very simple expedient of dry tumbling the prescribed constituents, which are in essentially dry particulate form at room temperature. With high density polyolefin materials, these cannot be masticated to fusing below the decomposition temperature of the blowing agent and therefore dry tumbling procedures must be used. Polyethylene having a density of greater than .925 gram/cm.$^3$ comes within this category.

Illustrative of the tumbling procedure, granules or particles of the polyolefin which have a diameter of about .125", metal soaps of about 200 mesh (U.S. Sieve) and the blowing agent, p,p'-oxybis(benzene sulfonyl hydrazide) having a mean particle size of about 15 microns can be effectively admixed in 20 minutes using about 45 r.p.m. rotary-type tumbling.

The expandable aliphatic polyolefin compositions are extruded at a temperature greater than the temperature at which decomposition of the blowing agent takes place and less than the temperature at which the hot foamed product will immediately collapse. A range of extrusion temperatures found to be applicable is 130° C.–270° C. with a range of 150° C.–220° C. adequate when the polyolefin involved is polyethylene. Some overlapping in the most effective ranges will exist between the polyolefin used; illustrative of this, somewhat higher temperatures can be used for polypropylene as compared to polyethylene.

The foamed product is extruded into a simple cooling medium which can be air, or a bath of water or other liquid maintained at a temperature of 10 to 60° C. Upon cooling, the foamed product has a density ranging between 0.2–0.9 gram/cm.$^3$ and more ideally 0.4–0.6 gram/cm.$^3$ when the product is designed for use as an electrical insulating material.

The foamed product which results from practice of the present invention has a cellular structure the cells of which are remote or discrete and otherwise described as unicellular, indicating that very little if any interconnection is established between the individual cells.

The rigid foamed polyolefin product can be used directly as electrical insulators in any desired size or shape reflecting the choice of die-head used on the extruder. The product can also be in the form of sheets, profiles and the like having utility as heat and vapor insulators. As indicated the inclusion of various colorants can be used to make the product more desirable for a designed use. The foamed products have an attractive range of densities as indicated above. This, together with their uniformity and discrete cellular structure, contributes exceptional insulating and mechanical properties to the product.

It will thus be seen that the objects set forth above, among those made apparent from the preceding description are efficiently attained. Since certain changes may be made in carrying out the above processes and the polymeric products without departing from the scope of the invention, it is intended that all matter contained in the above description shall be interpreted as illustrative and not in a limiting sense.

What is claimed is:

1. An expandable thermoplastic polymeric composition consisting essentially of (a) 100 parts by weight of a polymeric material selected from the class consisting of aliphatic polyolefins, the monomeric units of which contain 2–4 carbon atoms, said aliphatic polyolefin being the only polymeric material present in the composition, (b) 0.5–1.5 parts by weight of p,p'-oxybis(benzene sulfonyl hydrazide), and (c) 0.1–5.0 parts by weight of a metal soap selected from the class consisting of metal salts of fatty acids, the metals being divalent and trivalent in nature and the fatty acid moieties containing at least 8 carbon atoms and mixtures of the same.

2. An expandable thermoplastic polymeric composition consisting essentially of (a) 100 parts by weight of polyethylene, said polyethylene being the only polymeric material present in the composition, (b) about 1 part by weight of p,p'-oxybis(benzene sulfonyl hydrazide), and (c) 0.5–1.5 parts by weight of a metal soap selected from the class consisting of metal salts of fatty acids, the metals being divalent and trivalent in nature and the fatty acid moieties containing at least 8 carbon atoms and mixtures of the same.

3. A composition according to claim 2 wherein the metal of said metal soap constitutes zinc.

4. A composition according to claim 2 wherein the metal of said metal soap constitutes calcium.

5. A composition according to claim 2 wherein the metal of said metal soap constitutes barium.

6. A composition according to claim 2 wherein the metal of said metal soap constitutes magnesium.

7. A composition according to claim 2 wherein the metal of said metal soap constitutes aluminum.

8. A composition according to claim 2 wherein the fatty acid moiety of said metal soap constitutes stearate.

9. A composition according to claim 2 wherein the fatty acid moiety of said metal soap constitutes hydroxy stearate.

10. A composition according to claim 2 wherein the fatty acid moiety of said metal soap constitutes palmitate.

11. A composition according to claim 2 wherein the fatty acid moiety of said metal soap constitutes octoate.

12. An electrical insulating material comprising a rigid thermoplastic polymeric composition having a density of 0.4–0.6 gram/cm.$^3$ which results from expanding at a temperature of 130° C.–270° C. an expandable thermoplastic polymeric composition consisting essentially of (a) 100 parts by weight of a polymeric material selected from the class consisting of aliphatic polyolefins, the monomeric units of which contain 2–4 carbon atoms, said aliphatic polyolefin being the only polymeric material present in the composition, (b) 0.5–1.5 parts by weight of p,p'-oxybis(benzene sulfonyl hydrazide), and (c) 0.1–5.0 parts by weight of a metal soap selected from the class consisting of metal salts of fatty acids, the metals being divalent and trivalent in nature and the fatty acid moieties containing at least 8 carbon atoms and mixtures of the same, followed by cooling the same.

13. A process for providing an expandable polymeric composition capable of being extruded at a temperature of 130° C.–270° C. to produce a rigid thermoplastic foam having a density of 0.2–0.9 gram/cm.$^3$ which comprises admixing in essentially dry particulate form (a) 100 parts by weight of a polymeric material selected from the class consisting of aliphatic polyolefins, the monomeric units of which contain 2–4 carbon atoms, said aliphatic polyolefin being the only polymeric material present in the composition, (b) 0.5–1.5 parts by weight of p,p'-oxybis(benzene sulfonyl hydrazide), and (c) 0.1–5.0 parts by weight of a metal soap selected from the class consisting of metal salts of fatty acids, the metals being divalent and trivalent in nature and the fatty acid moieties containing at least 8 carbon atoms and mixtures of the same.

14. A process for providing an expandable polymeric composition capable of being extruded at a temperature of 150° C.–220° C. to produce a rigid thermoplastic foam having a density of 0.2–0.9 gram/cm.$^3$ which comprise admixing in essentially dry particulate form (a) 100 parts by weight of polyethylene, said polyethylene being the only polymeric material present in the composition, (b) 0.5–1.5 parts by weight of p,p'-oxybis(benzene sulfonyl hydrazide), and (c) 0.1–5.0 parts by weight of a metal soap selected from the class consisting of metal salts of atty acids, the metals being divalent and trivalent in nature and the fatty acid moieties containing 12–20 carbon atoms and mixtures of the same.

15. Wire coated with an electrical insulating material comprising a rigid thermoplastic polymeric composition having a density of 0.4–0.6 grams/cm.$^3$ which results from extruding over said wire at a temperature of 130° C.–270° C. an expandable thermoplastic composition consisting essentially of (a) 100 parts by weight of a polymeric material selected from the class consisting of aliphatic polyolefins, the monomeric units of which contain 2–4 carbon atoms, said aliphatic polyolefin being the only polymeric material present in the composition, (b) 0.5–1.5 parts by weight of p,p'-oxybis)benzene sulfonyl hydrazide), and (c) 0.1–5.0 parts by weight of a metal soap selected from the class consisting of metal salts of fatty acids, the metals being divalent and trivalent in nature and the fatty acid moieties containing at least 8 carbon atoms and mixtures of the same, followed by cooling the same.

References Cited in the file of this patent

UNITED STATES PATENTS

| | | |
|---|---|---|
| 2,461,761 | Nye | Feb. 15, 1949 |
| 2,597,741 | Macey | May 20, 1952 |
| 2,849,028 | Clark et al. | Aug. 26, 1958 |
| 2,888,407 | Cooper et al. | May 26, 1959 |